June 28, 1955 G. J. PECORARO 2,711,765
CARVING RACK
Filed April 27, 1954
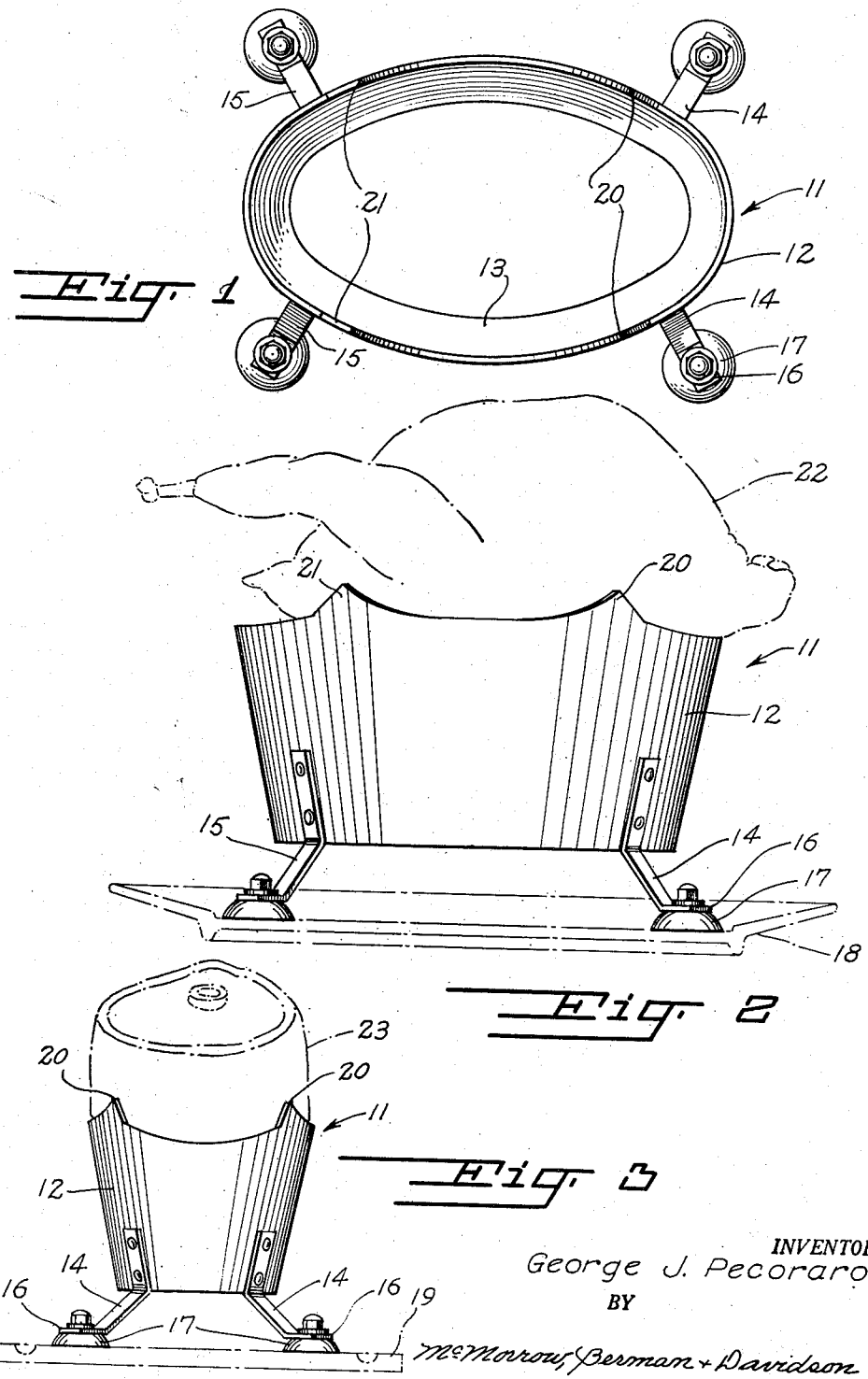
INVENTOR.
George J. Pecoraro
BY
McMorrow, Berman & Davidson
ATTORNEYS 2,711,765

CARVING RACK

George J. Pecoraro, New Hartford, N. Y.

Application April 27, 1954, Serial No. 425,967

3 Claims. (Cl. 146—216)

This invention relates to supporting devices for food articles, and more particularly to an improved supporting rack for use to support a fowl, roast, or similar food article for carving same.

A main object of the invention is to provide a novel and improved food supporting rack to be employed for supporting a fowl, roast, or similar food article for carving same, said rack being simple in construction, being compact in size, and providing a reliable support for the food article to be carved.

A further object of the invention is to provide an improved support for a food article to be carved, such as a fowl, roast, or the like, said support being inexpensive to manufacture, being durable in construction, and being attractive in appearance.

Further objects and advantages of the invention will become apparent from the following description and claims, and from the accompanying drawings, wherein:

Figure 1 is a top plan view of an improved supporting device for a food article to be carved, constructed in accordance with the present invention.

Figure 2 is a side elevational view of the supporting device of Figure 1.

Figure 3 is an end elevational view of the supporting device of Figures 1 and 2.

Referring to the drawings, the improved food article supporting device is designated generally at 11 and comprises a generally oval shell member 12 of any suitable rigid sheet material, such as stainless steel, aluminum or the like, the shell member 12 being of substantial height and tapering downwardly in horizontal cross sectional area, as is clearly shown in Figures 2 and 3. The shell member 12 is formed at its bottom edge with an inturned, continuous, stiffening flange 13 of substantial width.

Designated at 14, 14 and 15, 15 are respective pairs of downwardly and outwardly inclined legs secured to the lower portions of the opposite ends of the shell member 12 on opposite sides thereof, the legs being inclined downwardly and outwardly, as is clearly shown in Figures 2 and 3. Each leg is formed at its bottom end with an outwardly extending horizontal lug 16 to which is secured a downwardly facing resilient suction cup 17 of rubber or similar resilient deformable material. The suction cups 17 are adapted to detachably secure the shell member to a subjacent supporting surface, for example, to a platter 18, shown in dotted view in Figure 2, or to a flat carving board 19, as shown in dotted view in Figure 3.

The top edge of the shell member 12 is formed with respective pairs of upwardly projecting prong elements 20, 20 and 21, 21 on the opposite sides of the shell member and located adjacent the respective ends of said shell member, said prong elements being spaced to engage portions of a food article to be carved, for example, being spaced to engage the forward and rear portions, respectively, of a fowl, such as the fowl 22 shown in dotted view in Figure 2, when the fowl is disposed on the top edge of the shell member in the manner illustrated. Alternatively, the prong elements may engage the sides of a roast, such as the roast 23, shown in dotted view in Figure 3, when the roast is fitted into the shell member with the portion to be carved uppermost, as illustrated.

The respective pairs of prong elements 20, 20 and 21, 21 grip the food article to retain said food article securely on the top edge of the shell member, whereas the suction cups 17 anchor the shell member to the subjacent supporting surface, for example, to the platter 18 or to the carving board 19, whereby the food article is securely held in a suitable and convenient position for carving.

While a specific embodiment of an improved support for a food article to be carved has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A support for a food article to be carved comprising a generally oval, upstanding shell member of substantial height, a plurality of suction cups secured to the bottom edge of said shell member at spaced locations around the shell member to detachably secure said shell member to a subjacent supporting surface, and a plurality of upstanding prong elements integrally formed on the top edge of said shell member spaced to engage portions of a food article to be carved, the wall of said shell member being substantially vertical, whereby the food article is supported substantially on said top edge and prong elements.

2. A support for a food article to be carved comprising a generally oval, upstanding shell member of substantial height, a plurality of suction cups secured to the bottom edge of said shell member at spaced locations around the shell member to detachably secure said shell member to a subjacent supporting surface, and respective pairs of upstanding prong elements integrally formed on the top edge of said shell member on the opposite sides of and located adjacent the respective ends of said shell member, said prong elements being spaced to engage portions of a food article to be carved, the wall of said shell member being substantially vertical, whereby the food article is supported substantially on said top edge and prong elements.

3. A support for a food article to be carved comprising a generally oval, upstanding, downwardly tapering shell member of substantial height, respective pairs of downwardly and outwardly inclined legs secured to the lower portions of the opposite ends of said shell member on opposite sides thereof, respective suction cups secured to the outer ends of said legs to detachably secure said shell member to a subjacent supporting surface, and respective pairs of upstanding prong elements integrally formed on the top edge of said shell member on the opposite sides of and located adjacent the respective ends of said shell member, said prong elements being spaced to engage portions of a food article to be carved, the wall of said shell member being substantially vertical, whereby the food article is supported substantially on said top edge and prong elements.

References Cited in the file of this patent

UNITED STATES PATENTS

| 1,471,122 | Greaves | Oct. 16, 1923 |
| 2,620,003 | Perdue | Dec. 2, 1952 |

FOREIGN PATENTS

| 47,376 | France | Dec. 29, 1936 |
| | (1st Addition of No. 772,919) | |